United States Patent
Jackson (10) Patent No.: US 9,069,611 B2
(45) Date of Patent: *Jun. 30, 2015

(54) SYSTEM AND METHOD FOR PROVIDING DYNAMIC PROVISIONING WITHIN A COMPUTE ENVIRONMENT

(75) Inventor: David B. Jackson, Spanish Fork, UT (US)

(73) Assignee: Adaptive Computing Enterprises, Inc., Provo, UT (US)

(*) Notice: Subject to any disclaimer, the term of this patent is extended or adjusted under 35 U.S.C. 154(b) by 173 days.

This patent is subject to a terminal disclaimer.

(21) Appl. No.: 13/269,893

(22) Filed: Oct. 10, 2011

(65) Prior Publication Data

US 2012/0030685 A1    Feb. 2, 2012

Related U.S. Application Data (63) Continuation of application No. 11/155,091, filed on Jun. 17, 2005, now Pat. No. 8,037,475.

(60) Provisional application No. 60/581,257, filed on Jun. 18, 2004.

(51) Int. Cl.
    G06F 9/46    (2006.01)
    G06F 15/173  (2006.01)
    G06F 9/50    (2006.01)

(52) U.S. Cl.
    CPC ............... *G06F 9/50* (2013.01); *G06F 9/5027* (2013.01); *G06F 9/5072* (2013.01); *Y02B 60/142* (2013.01); *G06F 2209/504* (2013.01); *G06F 2209/5014* (2013.01)

(58) Field of Classification Search
    None
    See application file for complete search history.

(56) References Cited

U.S. PATENT DOCUMENTS

| | | |
|---|---|---|
| 6,021,425 A  | 2/2000  | Waldron, III et al. |
| 6,098,090 A  | 8/2000  | Burns |
| 6,154,778 A  | 11/2000 | Koistinen et al. |
| 6,324,279 B1 | 11/2001 | Kalmanek, Jr. et al. |
| 6,330,583 B1 | 12/2001 | Reiffin |
| 6,463,454 B1 | 10/2002 | Lumelsky et al. |
| 6,526,442 B1 | 2/2003  | Stupek, Jr. et al. |
| 6,651,082 B1 | 11/2003 | Kawase et al. |
| 6,725,456 B1 | 4/2004  | Bruno et al. |
| 6,785,794 B2 | 8/2004  | Chase et al. |
| 7,058,951 B2 | 6/2006  | Bril et al. |
| 7,065,764 B1 | 6/2006  | Prael et al. |
| 7,140,020 B2 | 11/2006 | McCarthy et al. |
| 7,146,353 B2 | 12/2006 | Garg et al. |
| 7,237,243 B2 | 6/2007  | Sutton et al. |
| 7,243,351 B2 | 7/2007  | Kundu |
| 7,412,492 B1 | 8/2008  | Waldspurger |
| 7,464,160 B2 | 12/2008 | Iszlai et al. |

(Continued)

*Primary Examiner* — Tammy Lee (57) ABSTRACT

The disclosure relates to systems, methods and computer-readable media for dynamically provisioning resources within a compute environment. The method aspect of the disclosure comprises A method of dynamically provisioning resources within a compute environment, the method comprises analyzing a queue of jobs to determine an availability of compute resources for each job, determining an availability of a scheduler of the compute environment to satisfy all service level agreements (SLAs) and target service levels within a current configuration of the compute resources, determining possible resource provisioning changes to improve SLA fulfillment, determining a cost of provisioning; and if provisioning changes improve overall SLA delivery, then re-provisioning at least one compute resource.

21 Claims, 4 Drawing Sheets

(56) References Cited

U.S. PATENT DOCUMENTS

| | | |
|---|---|---|
| 7,571,438 B2 * | 8/2009 | Jones et al. .................. 718/102 |
| 7,640,547 B2 | 12/2009 | Neiman et al. |
| 7,660,887 B2 | 2/2010 | Reedy et al. |
| 7,665,090 B1 * | 2/2010 | Tormasov et al. ............ 718/104 |
| 8,018,860 B1 * | 9/2011 | Cook ............................ 370/244 |
| 2002/0007389 A1 * | 1/2002 | Jones et al. .................. 709/104 |
| 2002/0065864 A1 | 5/2002 | Hartsell et al. |
| 2002/0120741 A1 | 8/2002 | Webb et al. |
| 2003/0009506 A1 * | 1/2003 | Bril et al. .................... 709/103 |
| 2003/0028642 A1 | 2/2003 | Agarwal et al. |
| 2003/0069918 A1 | 4/2003 | Lu et al. |
| 2004/0153563 A1 | 8/2004 | Shay et al. |
| 2004/0215780 A1 * | 10/2004 | Kawato ........................ 709/226 |
| 2004/0243378 A1 * | 12/2004 | Schnatterly et al. ........... 703/22 |
| 2005/0097560 A1 | 5/2005 | Rolia et al. |
| 2005/0108703 A1 | 5/2005 | Hellier |
| 2005/0172291 A1 | 8/2005 | Das et al. |
| 2005/0222885 A1 * | 10/2005 | Chen et al. ....................... 705/8 |
| 2005/0256946 A1 * | 11/2005 | Childress et al. ............. 709/223 |
| 2005/0278760 A1 | 12/2005 | Dewar et al. |
| 2006/0294238 A1 | 12/2006 | Naik et al. |
| 2007/0240162 A1 | 10/2007 | Coleman et al. |
| 2007/0297350 A1 * | 12/2007 | Eilam et al. .................. 370/255 |
| 2008/0216082 A1 | 9/2008 | Eilam et al. |

* cited by examiner

SYSTEM AND METHOD FOR PROVIDING DYNAMIC PROVISIONING WITHIN A COMPUTE ENVIRONMENT

PRIORITY CLAIM

The present application is a continuation of U.S. patent application Ser. No. 11/155,091, filed Jun. 17, 2005, which claims priority to U.S. Provisional Application No. 60/581,257 filed Jun. 18, 2004, the contents of which are incorporated herein by reference.

BACKGROUND

1. Technical Field

The present disclosure relates to provisioning resources in a compute environment and more specifically to a system and method of providing dynamic provisioning for operating systems, applications and/or other resources within the compute environment.

2. Introduction

The present disclosure relates to a system and method of managing resources in the context of a grid or cluster of computers. Grid computing can be defined as coordinated resource sharing and problem solving in dynamic, multi-institutional collaborations. Many computing projects require much more computational power and resources than a single computer can provide. Networked computers with peripheral resources such as printers, scanners, I/O devices, storage disks, scientific devices and instruments, etc. can be coordinated and utilized to complete a task.

Grid/cluster resource management generally describes the process of identifying requirements, matching resources to applications, allocating those resources, and scheduling and monitoring grid resources over time in order to run grid applications as efficiently as possible. Each project will utilize a different set of resources and thus is typically unique. In addition to the challenge of allocating resources for a particular job, grid administrators also have difficulty obtaining a clear understanding of the resources available, the current status of the grid and available resources, and real-time competing needs of various users.

Figure 1:
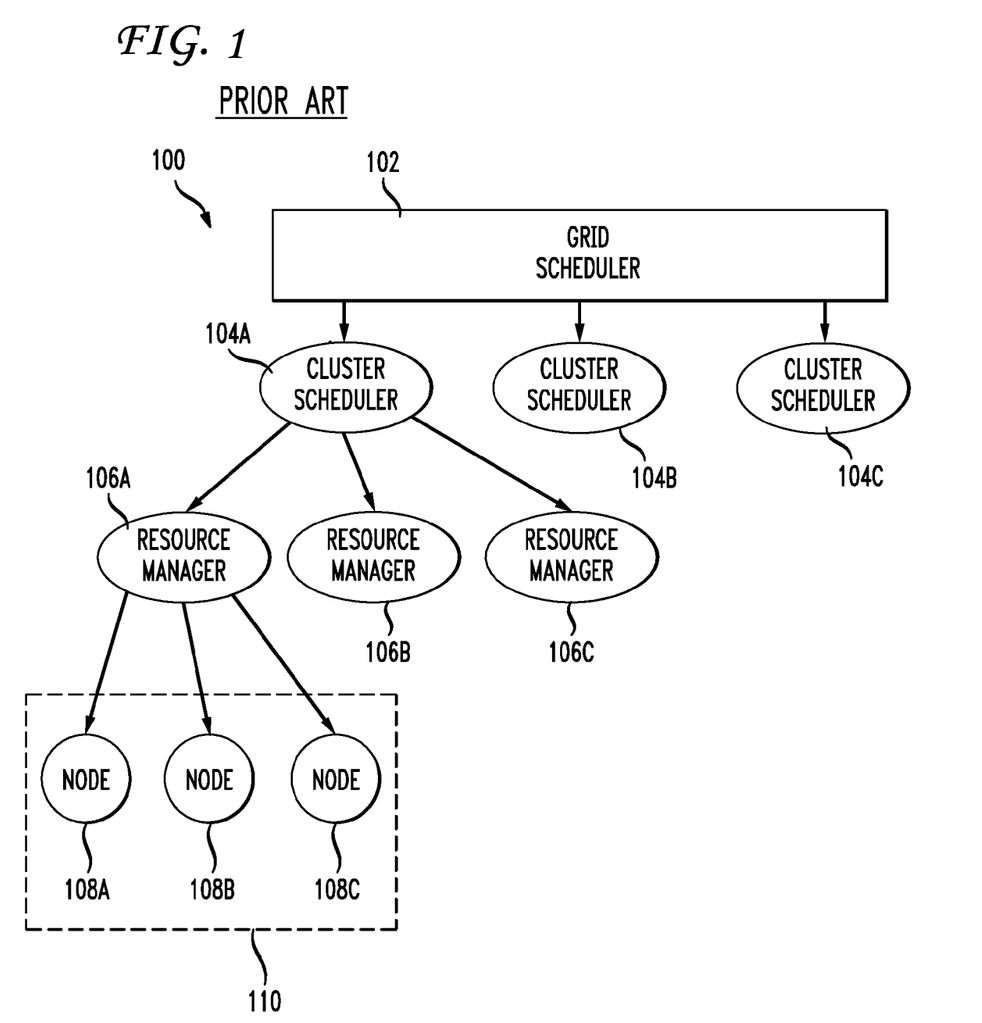
FIG. 1 illustrates a prior art compute environment.

Several general challenges exist when attempting to maximize resources in a grid. First, there are typically multiple layers of grid and cluster schedulers. FIG. 1 illustrates this point. A grid 100 generally comprises a group of clusters or a group of networked computers. The definition of a grid is very flexible and can mean a number of different configurations of computers. The introduction here is meant to be very general. The grid scheduler 102 communicates with a plurality of cluster schedulers 104A, 104B and 104C. Each of these cluster schedulers communication with a plurality of resource managers 106A, 106B and 106C. Each resource manager communicates with a series of compute resources shown as nodes 108A, 108B and 108C. These can be referred to as a cluster or compute environment 110.

Second, local schedulers (which can refer to either the cluster schedulers 104A, 104B, 104C or the resource managers 106A, 106B, 106C) are closer to the specific resources 108 and may not allow grid schedulers 102 direct access to the resources. The grid level scheduler 102 typically does not own or control the actual resources. Therefore, jobs are submitted from the high level grid-scheduler 102 to a local set of resources with no more permissions that the user would have. This reduces efficiencies.

Third, the heterogeneous nature of the shared resources causes a reduction in efficiency. Without dedicated access to a resource, the grid level scheduler 102 is challenged with the high degree of variance and unpredictability in the capacity of the resources available for use. Most resources are shared among users and projects and each project varies from the other.

Fourth, the performance goals for projects differ. Grid resources are used to improve performance of an application but the resource owners and users have different performance goals: from optimizing the performance for a single application to getting the best system throughput or minimizing response time. Local policies can also play a role in performance. Several publications provide introductory material regarding grid scheduling. See, e.g., Grid Resource Management, State of the Art and Future Trends, Jarek Nabrzyski, Jennifer M. Schopf, and Jan Weglarz, Kluwer Academic Publishers, 2004; and Beowulf Cluster Computing with Linux, edited by William Gropp, Ewing Lusk, and Thomas Sterling, Massachusetts Institute of Technology, 2003. The Beowulf Cluster Computing with Linux reference includes steps to creating a cluster.

Given the challenges associated with the compute environment, administrators have difficulty with regards to establishing operating systems and what operating systems are installed within a cluster. In many cases, clusters have a requirement for more than one operating system, such as the Macintosh, AIX, Microsoft NT, Linux, and so forth.

The majority of cases, an administrator or a group of administrators or managers will determine before the fact what particular mixture of these operating systems will be needed to be installed on the cluster nodes. In addition to operating systems, the same challenges exist for other resources within the cluster, such as software applications, memory requirements for each node, and other static or semi-static attributes.

These IT mangers and administrators must make a best estimate of the distribution of their workload and then they set up the cluster accordingly. Within a 64 node cluster, for instance, an administrator can assign 48 nodes to one operating system, 12 nodes to another operating system, and 4 more nodes to a third operating system. The administrator must anticipate what the workload will be. The problem with this approach is that as the system comes on line, users begin to submit jobs according to their needs and not necessarily what was configured by the operators and managers.

Load balancing issues can immediately exist between the various partitions which exist by virtue of the different operating systems. Partitions can relate to partitioning one of: operating systems, memory, disk space, a software application, a license or some other compute resource. One can find that the first operating system is under-utilized while the second and third operating systems are heavily over-utilized and there's nothing that can be done about it.

The cluster scheduler 104A, 104B, 104C simply does a matching policy to figure out if a job comes in and requires a particular operating system, and which node or set of nodes are best for running the job. If the scheduler 104A, 104B, 104C attempts but cannot establish matches between jobs and nodes, it queues the job until a match is available when some other job completes.

What is needed is a way to allow the compute environment to map more directly to the resources requested by in the incoming jobs.

SUMMARY

Additional features and advantages of the invention will be set forth in the description which follows, and in part will be obvious from the description, or can be learned by practice of the disclosure. The features and advantages of the disclosure can be realized and obtained by means of the instruments and combinations particularly pointed out in the appended claims. These and other features of the present disclosure will become more fully apparent from the following description and appended claims, or can be learned by the practice of the disclosure as set forth herein.

The disclosure relates to systems, methods and computer-readable media for dynamically provisioning resources within a compute environment. The method aspect of the disclosure comprises A method of dynamically provisioning resources within a compute environment, the method comprises analyzing a queue of jobs to determine an availability of compute resources for each job, determining an availability of a scheduler of the compute environment to satisfy all service level agreements (SLAs) and target service levels within a current configuration of the compute resources, determining possible resource provisioning changes to improve SLA fulfillment, determining a cost of provisioning; and if provisioning changes improve overall SLA delivery, then re-provisioning at least one compute resource. This is a looking forward view of the queue and dynamically provisioning the environment to meet the workload in the queue.

BRIEF DESCRIPTION OF THE DRAWINGS

In order to describe the manner in which the above-recited and other advantages and features of the disclosure can be obtained, a more particular description of the disclosure briefly described above will be rendered by reference to specific embodiments thereof which are illustrated in the appended drawings. Understanding that these drawings depict only typical embodiments of the disclosure and are not therefore to be considered to be limiting of its scope, the disclosure will be described and explained with additional specificity and detail through the use of the accompanying drawings in which.

DETAILED DESCRIPTION

Various embodiments of the disclosure are discussed in detail below. While specific implementations are discussed, it should be understood that this is done for illustration purposes only. A person skilled in the relevant art will recognize that other components and configurations can be used without parting from the spirit and scope of the disclosure.

The present disclosure addresses the deficiency in the prior art by providing a dynamic provisioning approach to compute environment management. The present disclosure includes systems, methods and computer-readable media for providing dynamic, load-based look-ahead provisioning of compute resources.

The present disclosure relates to managing resources within a compute environment. The environment can be operated by a hosting facility, hosting center, a virtual hosting center, data center, grid, cluster and/or utility-based computing environments and the like. The system aspect of the disclosure comprises a computing device that operates software that practices the steps of the disclosure to manage compute resources. There are many types of computing devices that are known to those of skill in the art and that are acceptable as the system embodiment of the disclosure. The computing device can be a single device or a plurality of connected computing devices that enable the disclosure to be practiced. The software operating within the system is comprised of computer program modules written in a computing language, such as the C programming language or any other suitable programming language. The programming modules include all the necessary programming to communicate with the compute environment (i.e., such as the cluster/grid) and both receive information about the compute resources within the compute environment and also manage the reservation, provisioning and use of those compute resources.

The primary disclosure disclosed herein relates to the concept of dynamically provisioning resources within the environment. Therefore, the system embodiment of the disclosure will include the various modules that practice the steps of the method embodiment of the disclosure disclosed herein. The hardware used in such a system or computing device for the disclosure will include the basic known and future-developed hard components such as a central processor(s), a bus, memory, a hard disk, I/O devices such as modems or network cards, a display device (optional) and so forth. A system for managing compute resources within a compute environment may comprise means for provisioning resources within a compute environment, the method comprising, means for analyzing a queue of jobs to determine an availability of compute resources for each job, means for determining an availability of a scheduler of the compute environment to satisfy all service level agreements (SLAs) and target service levels within a current configuration of the compute resources, means for determining possible resource provisioning changes to improve SLA fulfillment, means for determining a cost of provisioning and means for, if provisioning changes improve overall SLA delivery, re-provisioning at least one compute resource.

Availability or resources can be determined in terms of at least one of: a required OS, hardware architecture, network adapters, real memory, virtual memory, internal and external disk storage, and software applications. Other factors can also be part of the analysis of what resource is available. For example, availability can be constrained by a resource state, a reservation or other political policies.

The system can also include such components as means for instructing a provisioning service to re-provision the compute environment if the higher efficiency in the compute environment due to re-provisioning is greater than the loss associated with re-provisioning and means for continuing to analyze the queue of jobs to study the workload if the loss associated with re-provisioning is higher than the efficiency in the compute environment due to re-provisioning. The means for performing this can be, as mentioned above, computer programmed modules within a software package that perform these steps and other method steps discussed herein. An aspect of the analysis of jobs can involve determining a priority of jobs to compute environment objectives and/or a time frame in which jobs must complete to fulfill policies or requirements such as those set forth in the SLAs. Jobs can be further constrained in that only certain jobs are able to utilize or receive provisioning services. For example, jobs of a certain type or having a certain credential (from a particular group or a person on probation) can be prevented from receiving provisioning services.

Dynamic load-based look-ahead provisioning is a concept of utilizing a policy engine to query an expected load on any given resource provider whether it be a compute node with limited memory, network hardware with given bandwidth constraints, nodes with a given software product installed or particular operating system that is needed, software license issues, memory issues, disk space issues or other compute resource issues. Using the knowledge of current and future workload needs, the scheduler or other software module or modules provisions added resources to ensure that the limitations are overcome prior to the workload attempting to be accomplished. An example of this would be a using entity that needs eight nodes with application A on it for 12 hours three days from a job submission. The reservation is set and a query by a workload manager such as, for example, the Moab™ Workload Manager, identifies that only six nodes are available with the required application and it sets up a software provisioning request (by sending instructions to a software provisioning manager), to add the needed software to two additional nodes which it has reserved just prior to when the reservation is to begin. In this way, the workload manager dynamically looks ahead, discovers based on current load which nodes are available and then provisions additional resources to meet the workload need.

A cluster scheduler typically operates on a server and communicates with other nodes via any known network. The basic configuration of cluster and grid schedulers, and their communication means with resource managers and ultimately cluster resources such as nodes are known in the art.

The present disclosure involves enabling a cluster scheduler to interface with a provisioning managing service to dynamically match the configuration of the resources to the current workload. To illustrate how this is done, the above example is discussed with reference to FIG. 2. The architecture 200 shown in FIG. 2 includes a cluster 202 having sixteen nodes 224. A job queue 210 currently contains a plurality of jobs 212, 214, 216, 218, and 220. The partitioned operating systems, OS1 204, OS2 206 and OS3 222 are shown. These operating systems each span into multiple nodes 224 of the cluster 202. Assume that there is an over-commitment of resources to OS2 and OS3 as shown by the jobs having been assigned to their respective partitions for processing. In this example, jobs 212 and 214 are each assigned to OS1 204, job 216 is assigned to OS2, job 218 is assigned to OS3 and job 220 is assigned to process in both OS3 202 and OS2 206. The size of the partitions illustrates the relative size and processing power of each of the partitions of operating system. Since OS1 204 is larger, but has the same amount of jobs assigned to it (two), we can assume that OS1 204 has an over abundance of resources in comparison to OS2 206 and OS3 222.

Figure 2:
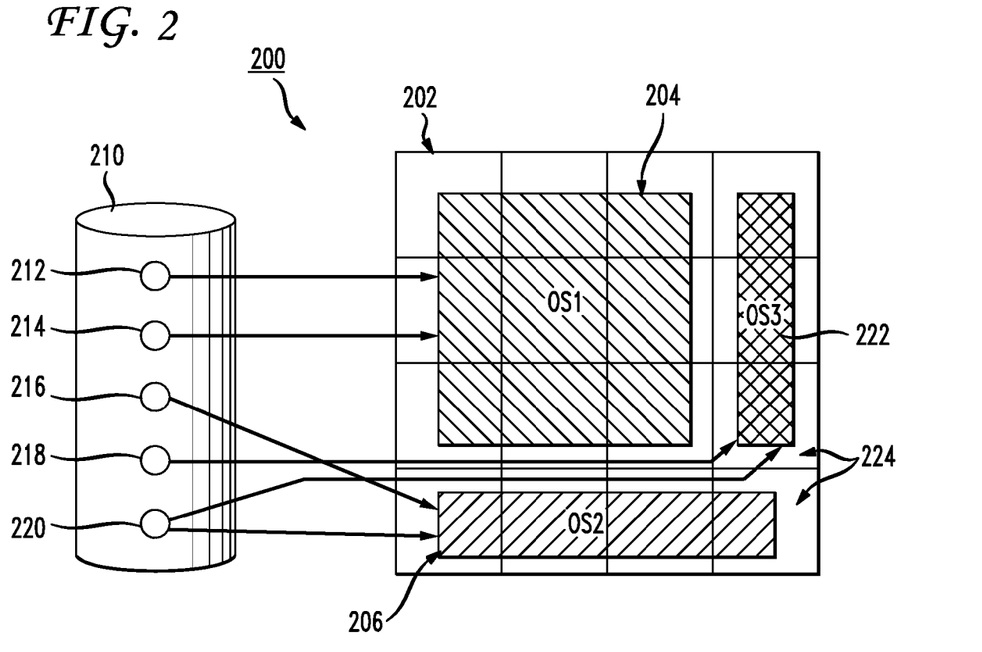
FIG. 2 illustrates a compute environment with a plurality of operating systems.

In addition to referencing FIG. 2, the method embodiment of the disclosure will be explained with reference to FIG. 3A. In response to this incongruence, the present disclosure comprises analyzing a queue of jobs 210 to determine an availability of compute resources for each job (302), determining an availability of a scheduler of the compute environment to satisfy all service level agreements (SLAs) and target service levels within a current configuration of the compute resources (304), determining possible resource provisioning changes to improve SLA fulfillment (306), determining a cost of provisioning (308) and if provisioning changes improve overall SLA delivery, then re-provisioning at least one compute resource (310).

The provisioning disclosure is independent of partitions whether they are logical or physical. A partition can be bounded along the respective operating systems. In other words, the various nodes within the cluster are logically partitioned so that each partition includes one of the three operating systems. In other cases, compute resources can be partitioned by the applications installed, the amount of memory available, the amount of local disk available, licenses, etc. The same basic approach works in all cases and one simply looks at the various dimensions of partitioning and determines the percent of future workload and the percentage of currently configured resources. The cluster scheduler then determines the amount of overhead required to re-provision the compute resources and determines whether the loss associated with the re-provisioning process is less than the increased efficiency which would result from the re-provisioned compute environment.

If the answer is yes, that re-provisioning increases efficiency, then the cluster manager proceeds to re-provision the cluster to bring it more in alignment with the current workload and returns to the analysis of the job queue. If the loss due to re-provisioning is greater than the increased efficiency from a re-provisioned compute environment, then the method simply returns to the analysis step without re-provisioning. The resulting cluster management approach is a cluster that is constantly and dynamically updating itself to meet with the current workload. This cluster does not have the same inefficiencies associated with under or over-utilized resources over portioning boundaries.

This approach also saves on overhead costs of managers and administrator that need to analyze and determine the ideal mixture of operating system, memory requirements, software application requirements, etc. for configuration of clusters. The cluster basically adjusts itself to the workload and the compute resources that are needed for optimal efficiency.

Figure 4:
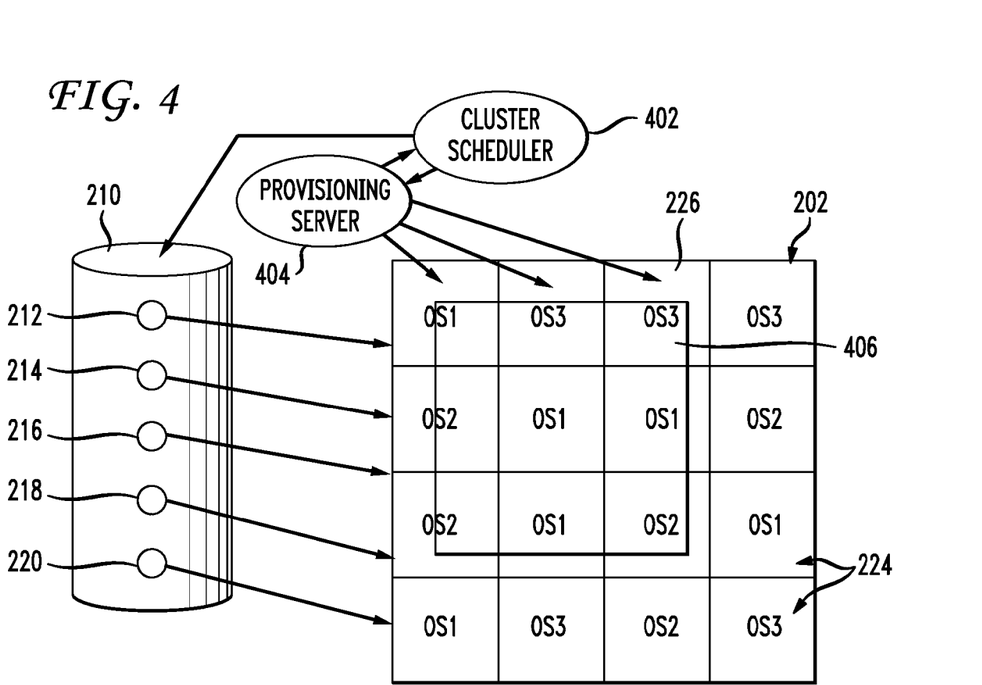
FIG. 4 illustrates a provisioning server associated with a cluster scheduler in an example of the application of the present disclosure.

A cluster scheduler incorporating the present disclosure will communicate with a cluster provisioning service, such as Novell's Red Carpet, or IBM CSM, or an open source provisioning service. This feature is illustrated in FIG. 4. The cluster scheduler 402 will make the determination of how the node configuration should change and then contact provisioning server 404 to request the change. The cluster scheduler can make the request in the follow way: please change operating system of node 226 from OS1 to OS3 and begin immediately. There can be offset and any kind of arbitrary instructions that are provided to the provisioning service according to the analysis done by the cluster scheduler of the workload and compute environment. As can be seen, the distribution of jobs and their assigned nodes within the cluster 202 from the job queue 210 is more evenly distributed.

In the context of the present disclosure, the term "cluster scheduler" can refer to a number of managing applications within a computing environment such as a cluster or a grid. For example, this term can apply to a resource manager, a cluster scheduler, a grid scheduler, a workload manager, a cluster or a grid monitor, a cluster manager and so forth. There are a number of software applications in the grid environment that can manage or schedule work at various layers of the network. The term "cluster scheduler" can refer to any of these components at the various layers of a grid or cluster.

Figure 3A:
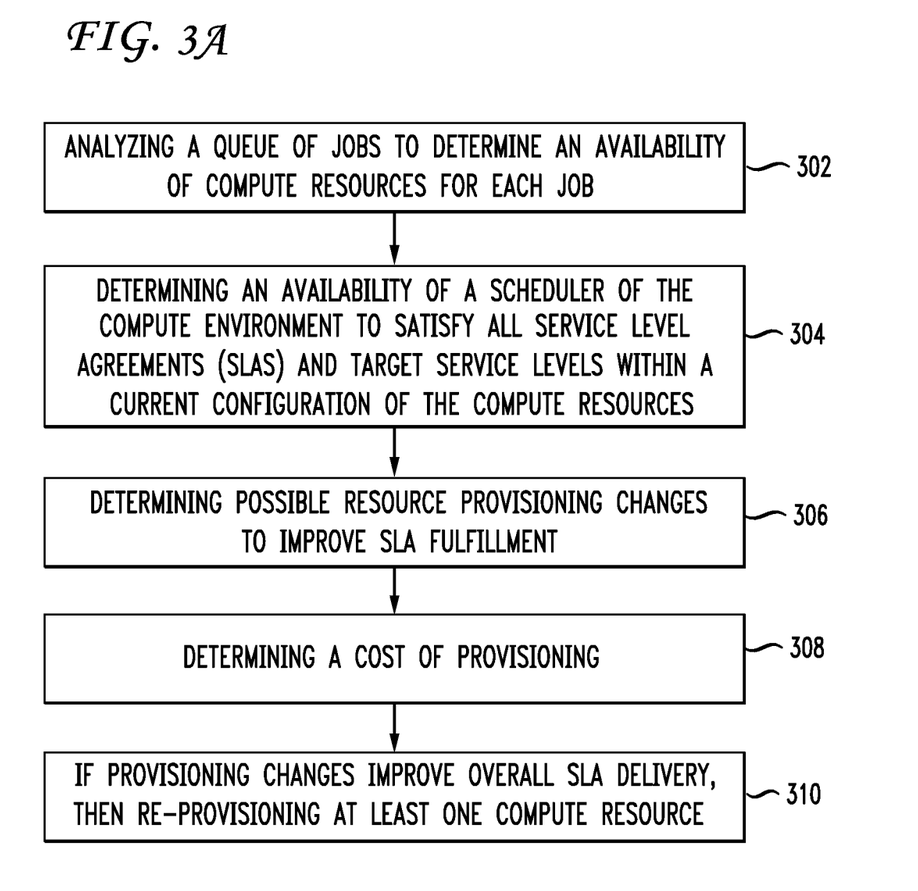
FIG. 3A illustrates a method embodiment of the disclosure.
Figure 3B:
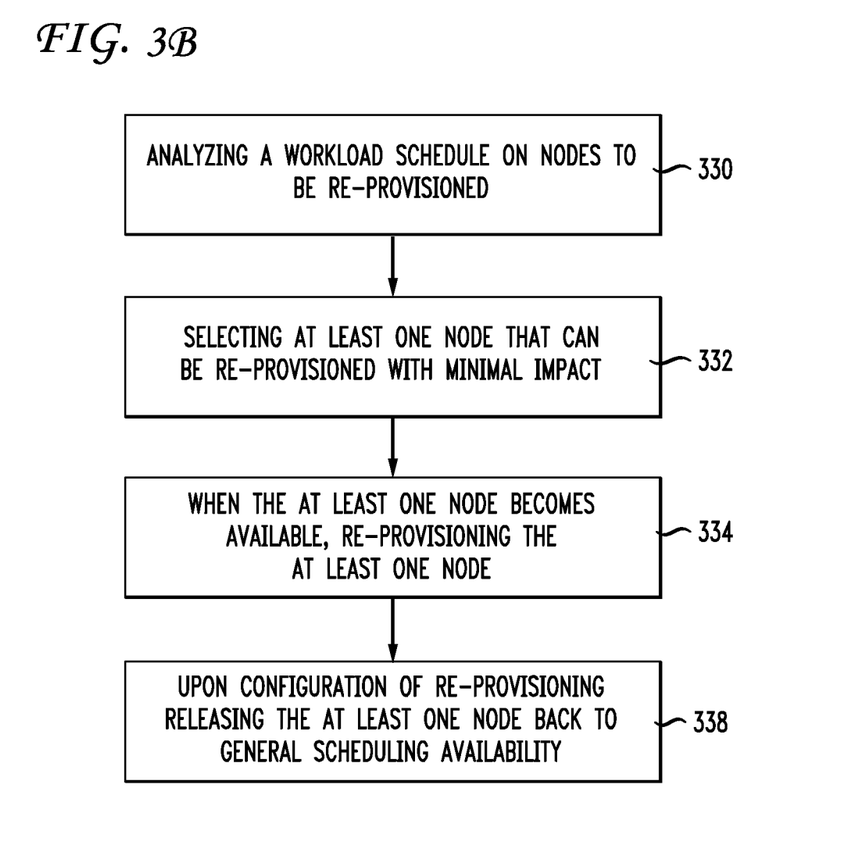
FIG. 3B illustrates another method embodiment of the present disclosure.

In another aspect of the disclosure shown in FIG. 3B, when the cluster scheduler makes a determination that it should re-provision the cluster, it can analyze the current workload schedule associated with the node or nodes that need to be re-provisioned (330). These nodes may or may not be reserved. The cluster scheduler will then select the at least one node that can be re-provisioned with minimal impact (332) and when the at least one node becomes available, instructing a provisioning service to re-provision the at least one node (334). This process may or may not involve creating a reservation for the one or more nodes. Such a reservation is shown as feature 406 in FIG. 4. Then, when the node(s) become available and there is no longer a workload running on them, the cluster scheduler 402 contacts the provisioning manager or provisioning server 404 and instructs the server 404 to change the state of (re-provision) the cluster. When the cluster scheduler 402 receives confirmation from the provisioning server 404 indicating that the change of state was successful, the cluster scheduler 402 releases the at least one node back to general scheduling and jobs can be started on the node(s) (336).

It is also noted that as shown in FIG. 4, the provisioning server 404 is a separate process or software entity from the cluster scheduler 402. This is a preferable way to perform these steps but it is also contemplated that the provisioning service would be incorporated as part of the cluster scheduler 402. It is immaterial to the present disclosure whether these processes are performed by two different software applications or one. Therefore, where the disclosure relates to providing instructions to a provisioning service to achieve the re-provisioning process, this includes the cluster scheduler instructing an internal provisioning service to carry out these processes.

If the cluster scheduler 402 determines that it is too expensive to do a full provision, an alternate step shown in FIG. 3A is to determine whether a partial re-provisioning can occur (314). If yes, then the method proceeds with the partial provisioning. If the analysis of a partial provisioning further determines that the overhead for that partial provisional is higher than the efficiencies gained, then the process returns to the initial analysis step (308).

As discussed above, the cost of re-provisioning is considered in the decision of whether or not to re-provision. The overhead associated with provisioning relates to the wasted resources that are not allocated to any job. In some cases, where the re-provisioning to occur can be considered "light-weight" and quick and easy to evaluate and complete, the cluster scheduler can dynamically take into account short term historical information (in whole or in part) to determine whether to continue with the re-provisioning. This historical information can be based on performance of the cluster, based on failure rates, based on quantity or loads according to job submissions, or any type of useful information about the compute resources and job submissions. Any combination of historical information can be utilized. The short term can include information over the past 5 hours (or any desired time frame) and whether resources were relatively over or underutilized given the workload for that period of time plus the current back-log and/or current workload. Determining if provisioning changes would improve the overall SLA delivery can be subject to provisioning costs in both long term and short term.

Instructions provided to the provisioning service can be modified based on analyzed historical information and the modification can involve such things as speeding up or slowing down the re-provisioning of the compute environment based on the historical information.

Another case relates to the ability of the cluster scheduler to record longer term information and determine not only what are the losses due to the operating system level partitioning (or whatever other resource is partitioned) that are going on within the current workload, but also how long this inefficiency been existed. For example, the system can determine what the losses have been over the last two weeks, the last three weeks, or any desired time frame. Those losses can be incorporated into the re-provisioning decision as well as the instructions to the provisioning service. This historical view can modify the re-provisioning timing and decision wherein the adjustments and modification can be made more slowly or more quickly. The instructions can also be modified to re-provision resources in a different order or in a different manner taking into account this historical information. In such cases, by extending the view the cluster scheduler can often make the costs of provisioning less than the cost of losses associated with the system.

As an example of a light-weight provisioning decision based on back-logged workload, consider if the re-provisioning relates to changing memory. Provisioning the change in memory takes about 30 seconds. If the evaluation of the current workload indicates that it is backlogged for the next 8 hours and the cluster would run slightly more efficiently with the memory change, then that decision can be made immediately without having to care about historical information because the cost of provisioning is so low. In another case, the cost of provisioning an operating system is on the order of six hours and there is a high failure probability the system will probably want to incorporate historical information, review what has previously happened, how the workload has adjusted over the last two weeks, what kind of losses occurred over the last couple of weeks, and then compare those losses on a per node basis, with the losses to re-provision on a per node basis. A threshold value can be set which if the cost of provisioning passes that threshold value, then the historical information will be incorporated. Therefore, the analyzed backlog which includes a work backlog analysis can be used to determine whether the loss associated with the re-provisioning justifies the overhead amount in comparison to a higher efficiency of the compute environment which would result from the re-provisioning.

As suggested above, an aspect of the disclosure involves analyzing failure probabilities for the re-provisioning and including the failure probability analysis in the determination of whether the cost associated with re-provisioning justifies the overhead amount in comparison to a higher efficiency of the compute environment which would result from the re-provisioning.

For example, the historical information allows the cluster scheduler to analyze the cluster along soft partitions such as the operating partition or memory partition (any type of partition), and decide that within a given partition OS1 is only running at 90% utilization, while OS2 and OS3 have both had 99% utilization. In that case, the system knows that there has been 10% available utilization over the last 2 weeks, and it can look at that historical information to assist in determining the cost to the cluster over time. In this regard, this approach does not directly identify how successful the provisioning has been, but relates to how long the workload configuration has caused under-commitment of OS1 and over or under-commitment of OS2 and OS3.

Another aspect of the present disclosure is that it is not limited or constrained to any particular compute resource, such as a node. The resources that can be re-provisioned include the operating systems, end user applications installed on the nodes, memory upgrades, local disk space available, or network provisioning with guaranteed bandwidth on a per node basis. The provisioning can also be for the number of processors assigned to a particular job, node or partition. The re-provisioning may also be for any other resource such as bandwidth, licenses, network resources, router usage, and so forth.

If the possible resource provisioning improves SLA fulfillment, then the method further comprises generating a schedule of times to provision each selected resource. Then re-provisioning compute resources occurs as their scheduled time arrives. These scheduled times may or may not be related to a reservation of the resources. In the reservation context, the disclosure would comprise creating a reservation for the at least one node to be re-provisioned. A group of nodes can also be reserved or absent a reservation, identified for re-provisioning. The nodes can be re-provisioned at the same time or can be re-provisioned in a piecemeal fashion depending on other factors such as workload usage. This can provide a reduced impact or cost for the re-provisioning where individual nodes are re-provisioned as they become available or based on some factor such as when each node's current configuration or usage justifies re-provisioning. Whereas other nodes within the identified group may not be in the same position to be re-provisioned.

After each node is re-provisioned it is release back into a general availability mode. The determination of when to release a node after re-provisioning can be independent of whether a provisioning service or a provisioning manager has the ability to report back success or failure of the re-provisioning step. There are various ways of more efficiently releasing the node back to general availability depending on the context and manner of its identification and re-provisioning process. For example, the scheduler can release the at least one compute resource (or node) back to a general availability occurs according to one of the following time frames: when a provisioning manager confirms that the re-provisioning is complete; if a re-provisioning scheduled time is set, ahead of the scheduled time if the provisioning manager confirms that the re-provisioning is complete; or if a re-provisioning scheduled time is set, after the scheduled time if the provisioning manager confirms that the re-provisioning is not complete or failed. If reservations are used to control resource access and schedule resource provisioning in time, then the scheduler can release resources from reservations prior to a reservation end time if the provisioning manager confirms successful completion of re-provisioning. The scheduler can extend the reservation while the provisioning manager confirms failure of re-provisioning.

Embodiments within the scope of the present disclosure can also include computer-readable media for carrying or having computer-executable instructions or data structures stored thereon. Such computer-readable media can be any available media that can be accessed by a general purpose or special purpose computer. By way of example, and not limitation, such computer-readable media can comprise non-transitory computer-readable media including RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the disclosure can be practiced in network computing environments with many types of computer system configurations, including personal computers, hand-held devices, multi-processor systems, microprocessor-based or programmable consumer electronics, network PCs, mini-computers, mainframe computers, and the like. Embodiments can also be practiced in distributed computing environments where tasks are performed by local and remote processing devices that are linked (either by hardwired links, wireless links, or by a combination thereof) through a communications network. In a distributed computing environment, program modules can be located in both local and remote memory storage devices.

Although the above description can contain specific details, they should not be construed as limiting the claims in any way. Other configurations of the described embodiments of the disclosure are part of the scope of this disclosure. Accordingly, the appended claims and their legal equivalents should only define the disclosure, rather than any specific examples given.

I claim:

1. A method comprising:
   determining, at a current time, an availability of compute resources within a compute environment for each workload in a queue of workload based on scheduled times of compute resources established for the each workload to yield an analysis, the each workload to consume scheduled compute resources at a future time, which is later than the current time, according to the scheduled times;
   based on the analysis, determining an ability of the compute environment to satisfy a service level agreement associated with the each workload in the queue of workload based on a current configuration of the compute environment;
   determining possible workload scheduling changes in the compute environment to improve service levels for at least one workload in the queue of workload;
   determining a cost of provisioning compute resources associated with the possible workload scheduling changes; and
   if the possible workload scheduling changes improve service levels within the compute environment, taking into account the cost, rescheduling the at least one workload in the compute environment prior to all workload in the queue of workload consuming compute resources in the compute environment.

2. The method of claim 1, further comprising determining if the possible workload scheduling changes improve service levels within the compute environment based on provisioning costs in both a long term and a short term.

3. The method of claim 1, further comprising provisioning compute resources as a respective scheduled time arrives for the at least one workload.

4. The method of claim 1, wherein availability is determined in terms of one of: a required operating system, hardware architecture, network adapters, real memory, virtual memory, internal and external disk storage, and a software application.

5. The method of claim 1, wherein the availability is further constrained by one of: a resource state, a reservation and a political policy.

6. The method of claim 1, further comprising determining a priority of workload to compute environment objectives and a time frame in which workload must complete to fulfill service level agreements.

7. The method of claim 1, wherein only certain workload in the queue of workload are enabled to receive provisioning services.

8. The method of claim 1, further comprising, if the compute environment will be rescheduled:
analyzing a workload schedule associated with a node to be rescheduled;
selecting at least one node that can be scheduled with a minimal impact; and
when the at least one node becomes available, instructing a scheduling service to schedule the at least one node.

9. The method of claim 8, wherein scheduling further comprises creating a reservation for the at least one node and provisioning the at least one node.

10. The method of claim 9, wherein provisioning the at least one node further comprises provisioning a group of nodes within the compute environment.

11. The method of claim 9, wherein provisioning the at least one node further comprises provisioning individual nodes piecemeal within the compute environment.

12. The method of claim 11, wherein provisioning the individual nodes piecemeal within the compute environment is based on workload within the compute environment.

13. The method of claim 1, further comprising releasing the compute resources back to a general availability.

14. The method of claim 13, wherein a scheduler releases the compute resources back to a general availability according to one of the following time frames:
when a provisioning manager confirms that a provisioning is complete;
if a provisioning scheduled time is set, ahead of the provisioning scheduled time if the provisioning manager confirms that the provisioning is complete; and
if a re-provisioning scheduled time is set, after the re-provisioning scheduled time if the provisioning manager confirms that the provisioning is one of complete and failed.

15. The method of claim 13, wherein reservations are used to control resource access and schedule resource provisioning in time.

16. The method of claim 15, wherein a scheduler will release resources from reservations prior to a reservation end time if a provisioning manager confirms successful completion of provisioning.

17. The method of claim 16, wherein the scheduler will extend the reservation while the provisioning manager confirms failure of provisioning.

18. The method of claim 1, further comprising:
analyzing historical information of the compute environment; and
determining whether to schedule the compute environment based at least in part on the historical information.

19. The method of claim 18, wherein the historical information is one of compute environment performance information, workload-submission information, and failure rate information.

20. A non-transitory computer-storage medium having stored therein instructions which, when executed by a processor, cause the processor to perform operations comprising:
determining, at a current time, an availability of compute resources within a compute environment for each workload in a queue of workload based on scheduled times of compute resources established for the each workload to yield an analysis, the each workload to consume scheduled compute resources at a future time, which is later than the current time, according to the schedules times;
based on the analysis, determining an ability of the compute environment to satisfy a service level agreement associated with the each workload in the queue of workload based on a current configuration of the compute environment;
determining possible workload scheduling changes in the compute environment to improve service levels for at least one workload in the queue of workload;
determining a cost of provisioning compute resources associated with the possible workload scheduling changes; and
if the possible workload scheduling changes improve service levels within the compute environment, taking into account the cost, rescheduling the at least one workload in the compute environment prior to all workload in the queue of workload consuming compute resources in the compute environment.

21. A system comprising:
a processor; and
a computer-readable storage medium having stored therein instructions which, when executed by the processor, cause the processor to perform operations comprising:
determining, at a current time, an availability of compute resources within a compute environment for each workload in a queue of workload based on scheduled times of compute resources established for the each workload to yield an analysis, the each workload to consume scheduled compute resources at a future time, which is later that the current time, according to the schedules times;
based on the analysis, determining an ability of the compute environment to satisfy a service level agreement associated with the each workload in the queue of workload based on a current configuration of the compute environment;
determining possible workload scheduling changes in the compute environment to improve service levels for at least one workload in the queue of workload;
determining a cost of provisioning compute resources associated with the possible workload scheduling changes; and
rescheduling the at least one workload in the compute environment prior to all workload in the queue of workload consuming compute resources in the compute environment, if the possible workload scheduling changes improve service levels within the compute environment, taking into account the cost.

* * * * *